(12) United States Patent
Chiang et al.

(10) Patent No.: US 7,359,189 B2
(45) Date of Patent: Apr. 15, 2008

(54) ELECTRONIC DEVICE WITH REMOVABLE MODULE

(75) Inventors: Lin-Hsu Chiang, Taipei (TW); Shih-Kun Chou, Taipei (TW); Pi-Min Kao, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 0 days.

(21) Appl. No.: 11/687,286

(22) Filed: Mar. 16, 2007

(65) Prior Publication Data

US 2007/0223189 A1 Sep. 27, 2007

(30) Foreign Application Priority Data

Mar. 22, 2006 (TW) ............................... 95109943 A

(51) Int. Cl.
*H05K 7/00* (2006.01)
(52) U.S. Cl. ...................... 361/685; 361/726; 361/727
(58) Field of Classification Search ................ 361/685, 361/727, 726
See application file for complete search history.

(56) References Cited

U.S. PATENT DOCUMENTS

| | | | | |
|---|---|---|---|---|
| 5,682,291 A | * | 10/1997 | Jeffries et al. | 361/685 |
| 6,094,342 A | * | 7/2000 | Dague et al. | 361/685 |
| 6,467,858 B1 | * | 10/2002 | Le et al. | 312/223.2 |
| 6,590,775 B2 | * | 7/2003 | Chen | 361/725 |
| 7,031,150 B2 | * | 4/2006 | Chen et al. | 361/685 |
| 7,209,346 B2 | * | 4/2007 | Fujimoto et al. | 361/685 |

FOREIGN PATENT DOCUMENTS

| | | |
|---|---|---|
| TW | 476438 | 2/2002 |
| TW | 244715 | 9/2004 |
| TW | 249173 | 11/2004 |

* cited by examiner

*Primary Examiner*—Jayprakash N Gandhi
*Assistant Examiner*—Ingrid Wright
(74) *Attorney, Agent, or Firm*—Thomas, Kayden, Horstemeyer & Risley

(57) ABSTRACT

An electronic device has a removable module installed inside. The removable module includes a first surface and a second surface. The first surface is adjacent to the second surface. At least one first fastener is disposed on the first surface. At least one second fastener is disposed on the second surface. A printed circuit board and at least one track are installed in the housing. At least one rail has at least one third fastener and fourth fastener. The third fastener is inserted into the first fastener. The fourth fastener is inserted into the second fastener. The rail is disposed between the track and the removable module.

10 Claims, 4 Drawing Sheets

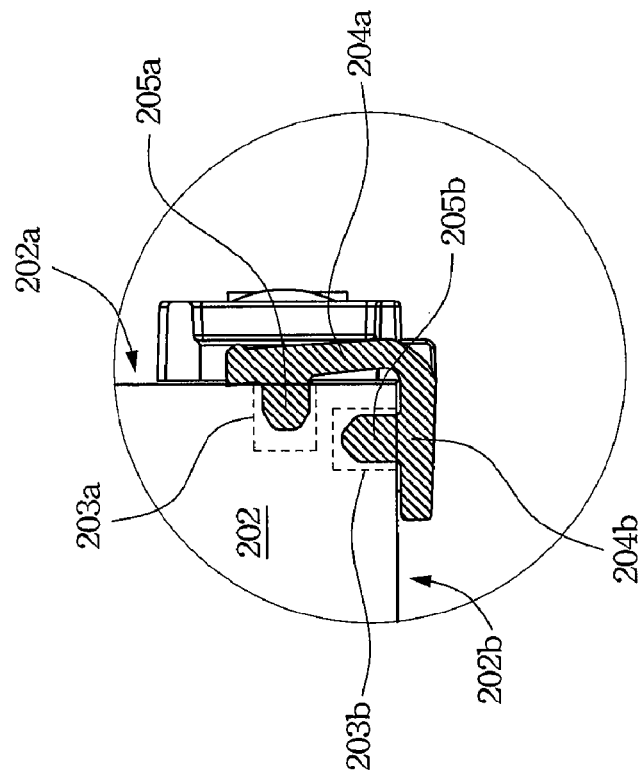
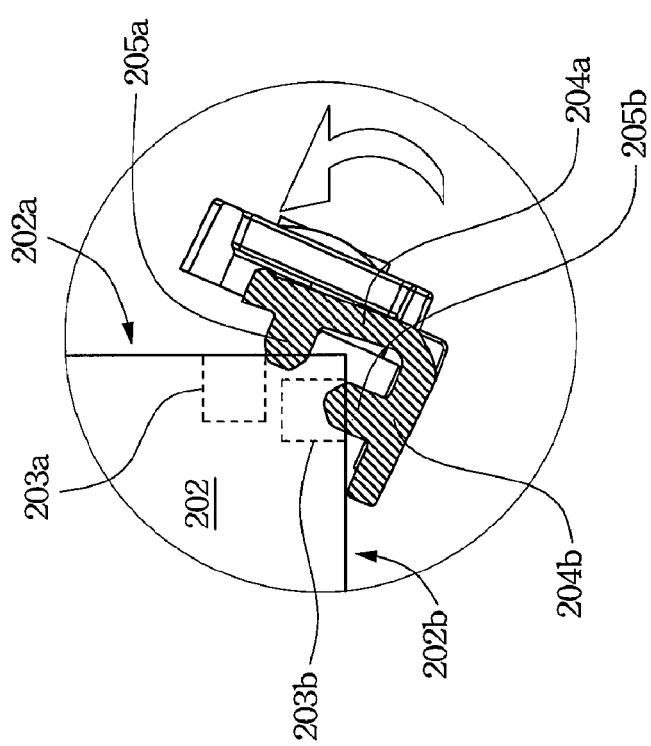
Fig. 4A
Fig. 4B

ELECTRONIC DEVICE WITH REMOVABLE MODULE

RELATED APPLICATIONS

This application claims priority to Taiwan Application Serial Number 95109943, filed Mar. 22, 2006, which is herein incorporated by reference.

BACKGROUND

1. Field of Invention

The present invention relates to an electronic device. More particularly, the present invention relates to an electronic device with a removable module.

2. Description of Related Art

A computer or computer sever usually has its storage device, i.e. an optical drive or a hard disk drive, designed as an easily replaced removable module. The housing of the computer or computer sever needs a track and the removable module needs a rail such that the removable module can be conveniently pulled out or inserted by means of the rail sliding along the track.

However, conventionally to the rail is attached to the removable module with springs, screws or clips. Extra tools are therefore inconveniently required by users (e.g. manufacturing technicians or DIY computer users) to secure the springs, screws or clips in order to attach the rail to the removable module.

SUMMARY

It is therefore an objective of the present invention to provide an electronic device with a removable module so as to enable a user to detachably mount the removable module in the electronic device without using extra tools.

In accordance with the foregoing and other objectives of the present invention, an electronic device has a removable module installed inside. The removable module includes a first surface and a second surface. The first surface is adjacent to the second surface. At least one first fastener is disposed on the first surface. At least one second fastener is disposed on the second surface. A printed circuit board and at least one track are installed in the housing. At least one rail has at least one third fastener and one fourth fastener. The third fastener is inserted into the first fastener. The fourth fastener is inserted into the second fastener. The rail is disposed between the track and the removable module.

According to preferred embodiments, the housing further comprises an accommodation space, and the removable module is pulled out or inserted into the accommodation space by means of the rail sliding along the track. The rail further comprises a first portion and a second portion. The third fastener is disposed on the first portion, and the fourth fastener is disposed on the second portion. The first portion is contact with the first surface, and the second portion is in contact with the second portion. The housing further comprises a fifth fastener, and the rail further comprises a sixth fastener and a release portion. When the rail is inserted into the track at a first position, the sixth fastener fits into the fifth fastener. When the release portion is pressed, the sixth fastener is removed from the fifth fastener. The fifth fastener is a hole, the sixth fastener is a pin, and the release portion is a suspension arm. The first and second fasteners are through holes, and the third and fourth fasteners are pins. The first surface is a side surface of the removable module, and the second surface is a bottom surface of the removable module.

Thus, the removable module and the removable module rail of the present invention enables manufacturing technicians or DIY computer users to rapidly assemble these removable modules without using extra tools.

It is to be understood that both the foregoing general description and the following detailed description are by examples, and are intended to provide further explanations of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 3, 4A and 4B illustrate perspective views of how a removable module and its rail are assembled together according to one preferred embodiment of this invention.

DESCRIPTION OF THE PREFERRED EMBODIMENTS

Figure 1:
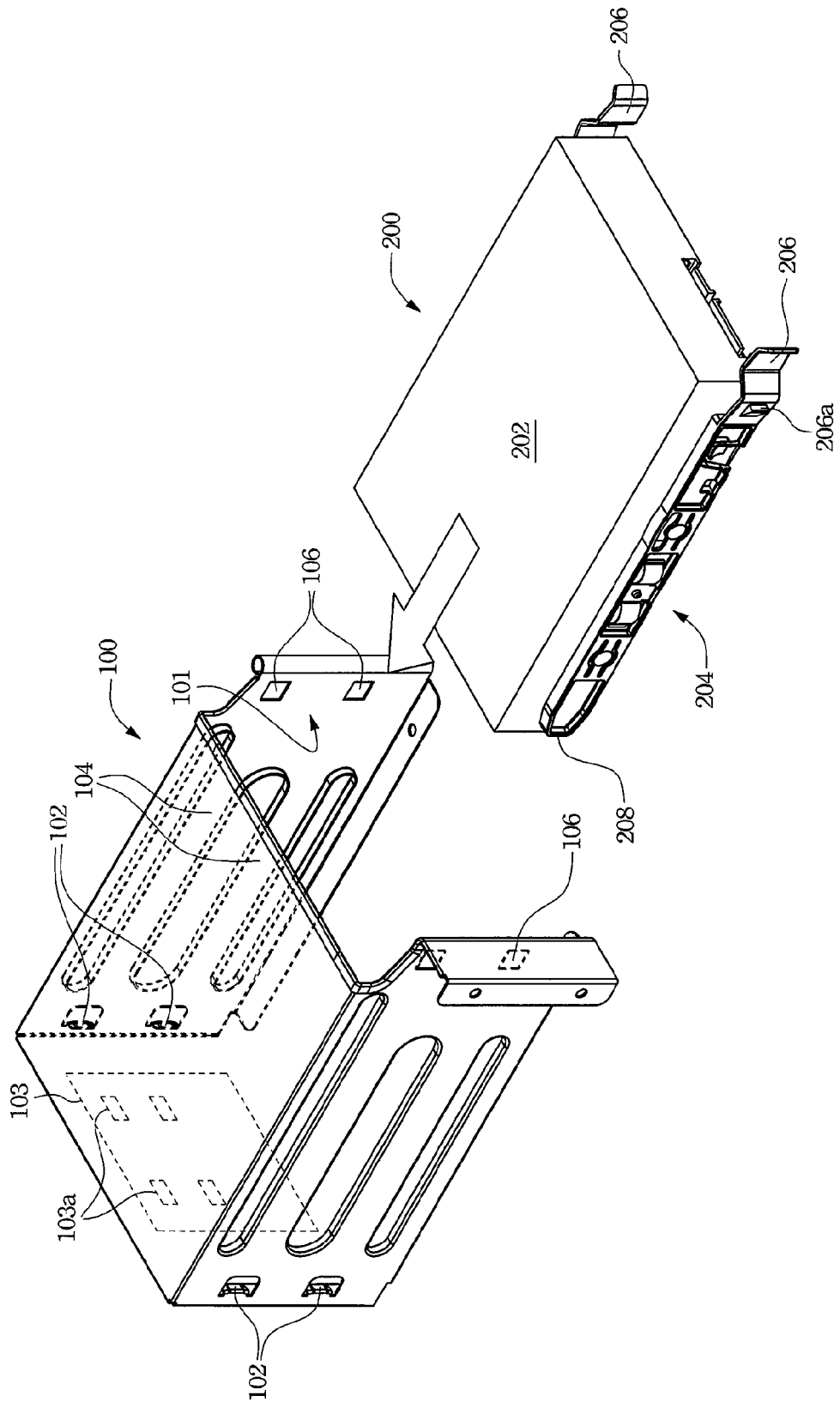
FIG. 1 illustrates a perspective view of the housing and a removable module of an electronic device according to one preferred embodiment of this invention.

As stated above, present invention provides a removable module and a removable module rail, which can be assembled or disassembled without using a tool. The L-shaped rail is secured to a side surface and a bottom surface of the removable module. Due to fastener designs and elastic characteristics of the L-shaped rail, it can be easily secured to and in contact with the side surface and the bottom surface of the removable module.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a perspective view of the removable module housing and a removable module of an electronic device according to one preferred embodiment of this invention. A housing or part of the housing 100 of an electronic device has an accommodation space (void space) for receiving a removable module 200. A blocking member 102, a track 104 and a fifth fastener 106 (such as a hole) are designed on an inner metal plate 101 of the is housing 100. When the removable module 200 is pulled out or inserted into the accommodation space of the housing 100, a rail 204 (secured to the removable module 200) slides along the track 104.

When the removable module 200 is inserted onto the track 104 and the blocking member 102 is in contact with an end portion 208 of the rail 204, a sixth fastener 206a (such as a pin) of the release portion 206 fits into the fifth fastener 106. The removable module 100 is thus secured to the housing 100. When the removable module 100 is pulled out of the housing 100, two release portions 206 (such as two suspension arms) are pressed inwards. The sixth fastener 206a is then removed from the fifth fastener 106 and the removable module 100 is released and can be pulled out of the housing 100. A printed circuit board 103 is installed in the housing 100, and a connector 103a of the printed circuit board 103 can be coupled to the body 202 of the removable module 100 so as to provide power and control signals.

The body 202 of the removable module 100 can be an optical disk drive, a floppy disk drive or a hard disk drive.

Figure 2:
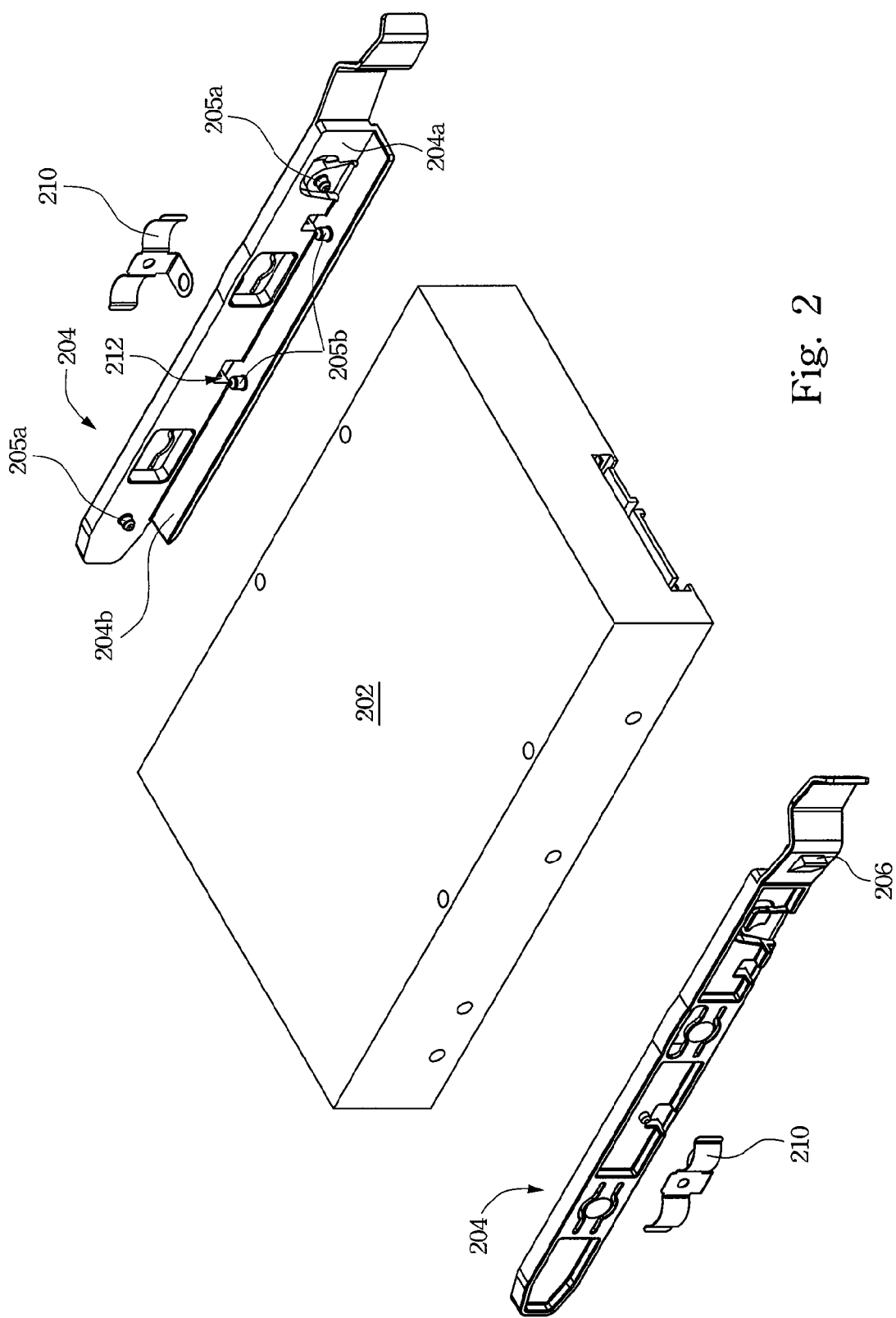
FIG. 2 illustrates an exploded view of a removable module according to one preferred embodiment of this invention.

FIG. 2 illustrates an exploded view of a removable module according to one preferred embodiment of this invention. An L-shaped rail 204 illustrated in the drawing can be detachably secured to the removable module 200 without using any tools, and the removable module 200 can subsequently be inserted into or pulled out from the housing 100. A first portion 204a (vertical portion) and a second portion 204b (horizontal portion) of the L-shaped rail 204 respectively has third fasteners 205a (such as pins) and fourth fasteners 205b (such as pins) so as to secure and cover a corner of the body 202. The rail 204 further includes a through hole 212, and a metal ground piece 210 links the body 202 and the rail 204 (as illustrated in FIG. 1) via the through hole 212. The rail 204 is made of plastic materials, which provide proper elastic characteristics for securing to the body 202.

Figure 3:
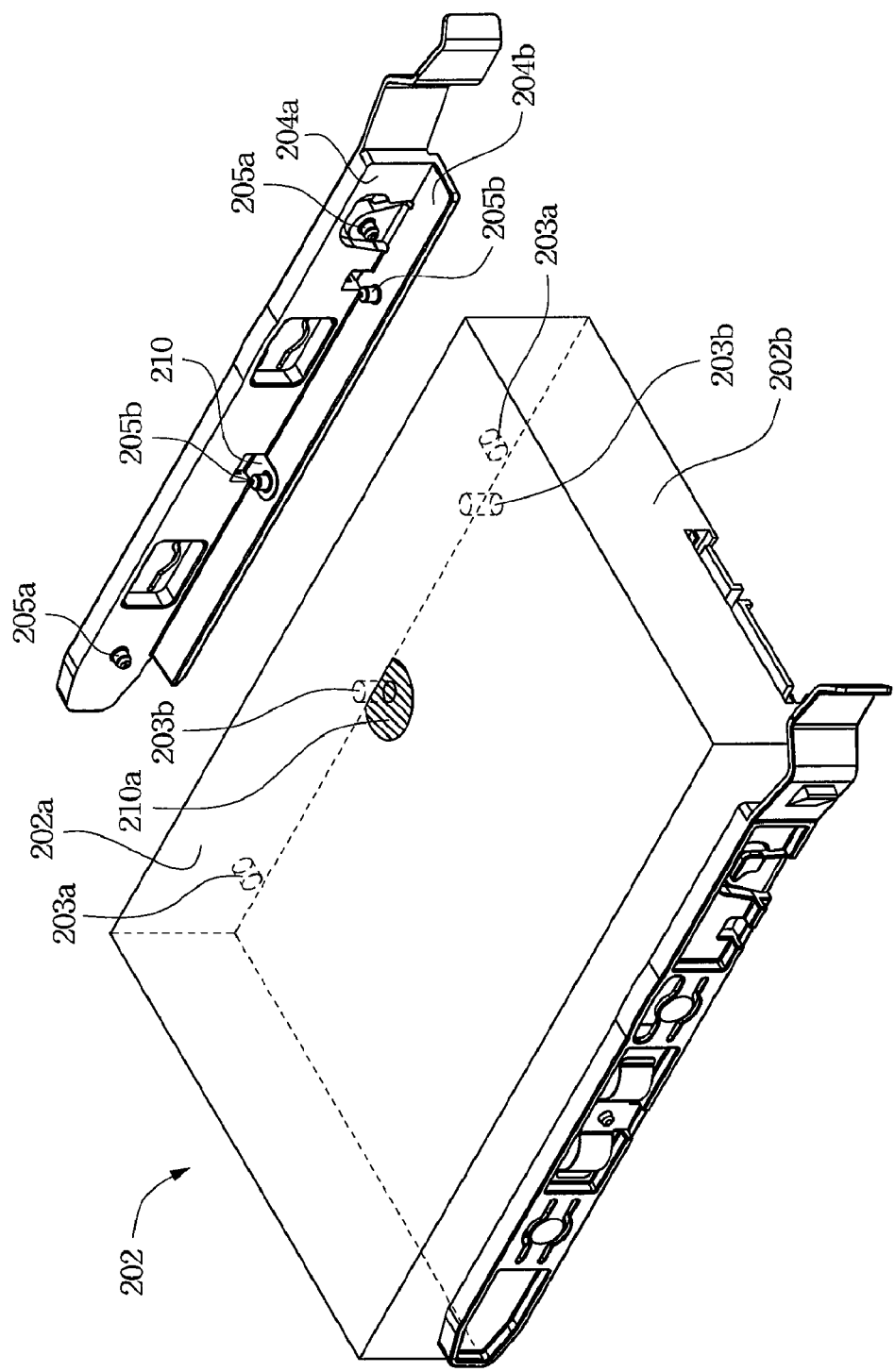

FIGS. 3, 4A and 4B illustrate perspective views of how a removable module and its rail are assembled together according to one preferred embodiment of this invention. A first surface 202a (side surface) of the body 202 is secured to and in contact with the first portion 204a (vertical portion) of the L-shaped rail 204. A second surface 202b (bottom surface) of the body 202 is secured to and in contact with the second portion 204b (horizontal portion) of the L-shaped rail 204. A first fastener 203a (a hole) of the first surface 202a (side surface) fits into the third fastener 205a (a pin) of the first portion 204a (vertical portion). A second fastener 203b (a hole) of the second surface 202b (bottom surface) fits into the fourth fastener 205b (a pin) of the second portion 204b (horizontal portion). The metal ground piece 210 goes through the rail 204 and is in contact with a ground electrode 210a on the second surface 202b (bottom surface).

FIGS. 4A and 4B illustrate better ways for securing the rail 204 to the body 202 of the removable module 200. First, the fourth fastener 205b (a pin) of the second portion 204b (horizontal portion) fits into the second fastener 203b (a hole) of the second surface 202b (bottom surface). Second, the third fastener 205a (a pin) of the first portion 204a (vertical portion) fits into the first fastener 203a (a hole) of the first surface 202a (side surface) along the arrow in FIG. 4A. An eventual result of securing the rail 204 to the body 202 is illustrated in FIG. 4B.

According to preferred embodiments, the removable module and the removable module rail of the present invention enables manufacturing technicians or a DIY computer users to assemble them rapidly and without using extra tools.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device having a removable module installed inside, the removable module including two interval-spaced first surfaces and a second surface, the first surfaces being adjacent and perpendicular to the second surface, at least one first fastener being disposed on each of the first surfaces, at least one second fastener being disposed on the second surface, the electronic device comprising:
   a housing;
   a printed circuit board, installed in the housing;
   at least one track, disposed in the housing; and
   two rails, each having at least one third fastener on a first portion and fourth fastener on a second portion, the third fastener being inserted into the first fastener, the fourth fastener being inserted into the second fastener, the second portion of the two rails being in contact with the second surface but apart from each other, the first portion of each rail being in contact with each first surface, wherein the first portion of each rail is disposed between the track and the removable module.

2. The electronic device of claim 1, wherein the housing further comprises an accommodation space, and the removable module is into a slide relevant to the rail for in and out of the accommodation space.

3. The electronic device of claim 1, wherein the housing further comprises a fifth fastener, the rail further comprising a sixth fastener and a release portion, when the rail is inserted into the track at a first position, the sixth fastener fits into the fifth fastener, when the release portion is pressed, the sixth fastener is removed from the fifth fastener.

4. The electronic device of claim 3, wherein the fifth fastener is a hole, the sixth fastener is a pin, and the release portion is a suspension arm.

5. The electronic device of claim 1, wherein the rail is disposed around a corner of the removable module.

6. The electronic device of claim 1, wherein the rail is made of plastic.

7. The electronic device of claim 1, wherein the rail further comprises a through hole and a metal ground piece links the removable module and the rail via the through hole.

8. The electronic device of claim 1, wherein the track is disposed on a metal plate of the housing.

9. The electronic device of claim 1, wherein the first and second fasteners are holes, the third and fourth fasteners are pins, the first surface is a side surface of the removable module, the second surface is a bottom surface of the removable module.

10. The electronic device of claim 1, wherein the fourth fastener being inserted into the second fastener whenever the removable module being in and out of the accommodation space.

* * * * *